Patented Feb. 22, 1949

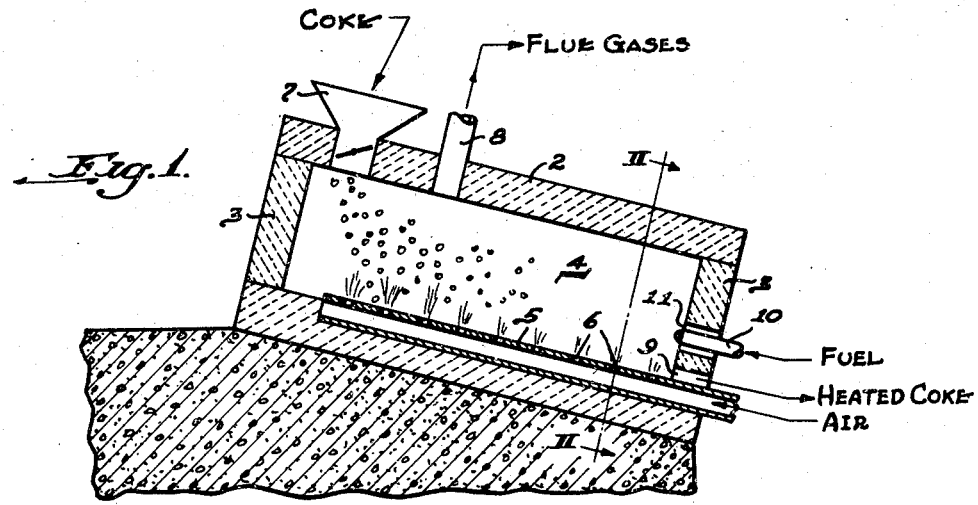
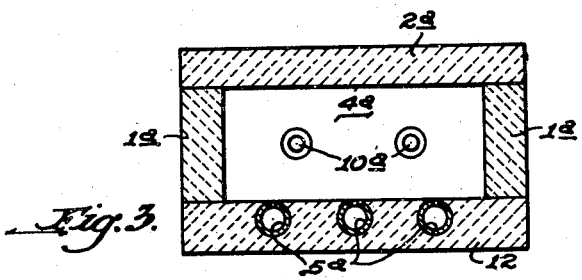
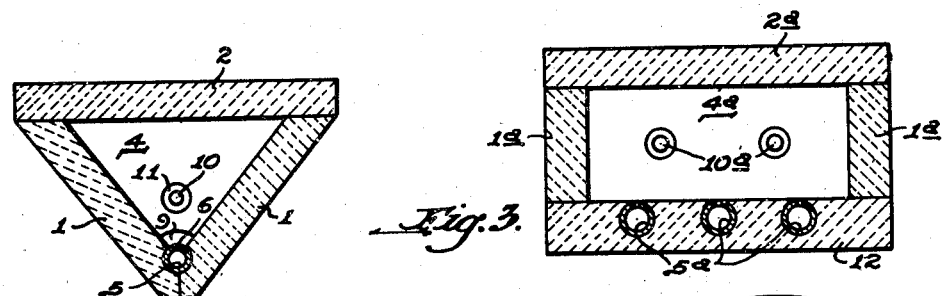
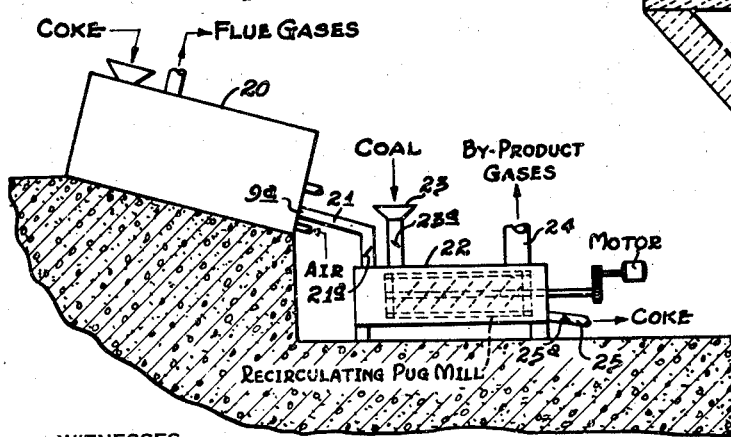
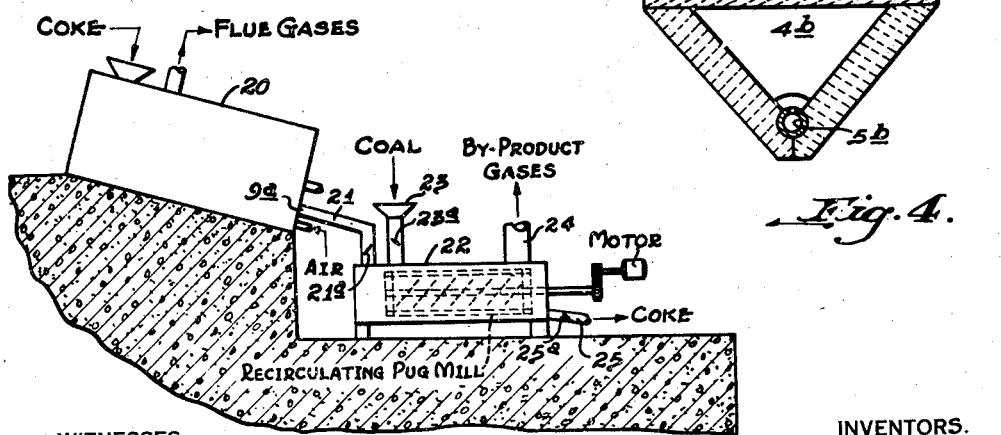

2,462,366

UNITED STATES PATENT OFFICE 2,462,366

HEATING OF GRANULAR MATERIALS

Caleb Davies, Jr., Ben Avon, and Robert York, Jr., Pittsburgh, Pa., assignors, by direct and mesne assignments, to Pittsburgh Consolidation Coal Company, Pittsburgh, Pa., a corporation of Pennsylvania Application January 21, 1944, Serial No. 519,248

4 Claims. (Cl. 263—21)

This invention relates to the heating of granular materials, and in a special embodiment to the by-product coking of coal.

Difficulties are encountered in heating granular solids by existing methods. For example, if the granular material is heated indirectly, i. e., by heat transmitted through a container wall, the heating is inefficient, as because the rate of heating and attainment of a desired result may be low, or because the temperature differential between the heating medium and the granular material that is inevitably necessary to bring the latter to a desired temperature necessitates supplying to the heating medium an excess of heat over that which would be necessary if it could be supplied directly to the granular solid material. Heat losses aggravate the inefficiency of such procedures as the temperature to which the material is to be heated becomes higher. Likewise, in order to bring all of a body of such material to a desired temperature by indirect heating methods it is generally true that the portions nearer the container wall, or the outer portions of large granules, are overheated if the entire mass is brought to a desired temperature within a reasonable or practicable length of time. Overheating is, in many cases, disadvantageous, as is well known. In the case of direct heating by passing a heated gas into contact with the granular material there is usually a tendency for channeling with consequent overheating of the immediately adjacent material and underheating of the remaining portion. With both types of heating, sticking of the material to the container or agglomeration of the granules may occur. In addition to thermal inefficiency due to overheating the heating medium and some portions of the charge, a further objection to driving heat through container walls and masses of heated material is the restriction on the rate of heating (B. t. u. per hour per sq. ft.) which is obtainable without exceeding practicable temperatures in the heating medium. The slower the heating the greater is the necessary area of heating surface, and consequently the greater is the investment, for a given rate of throughput.

These difficulties are exemplified by modern coke oven practice which requires heat to be conducted over considerable distances, such, for instance, as through retort walls, layers of large coke bodies, layers of coal in plastic condition, and layers of stationary granular coal, or from the outside to the inside of large lumps of coal. These conditions tend to require large temperature differences which may result in the flow of some of the tar-laden gas from its point of origin into hotter parts of the oven with consequent destruction of a part of the by-products, especially the valuable tar acids, by secondary thermal decomposition. The prolonged heating of the coal that results may also seriously decrease the tar yield. Other difficulties resulting from such indirect heating are known in the coking art.

Also, in the usual combustion devices it is very difficult to heat granular coke, known as coke breeze, without troublesome clinker formation due to local overheating (non-uniform heating), even when the average temperature of the coke is much lower than the fusion point of the ash. Uniformity of heating is also important in other operations which must be carried out below the softening point of the material to be heated.

It is among the objects of this invention to provide a method of and apparatus for heating granular materials which accomplish rapid and uniform heating of the granules at low investment and operating cost, and in the use of which difficulties encountered previously in heating such materials are reduced or overcome.

Another object is to provide an apparatus for heating granular materials quickly, efficiently and uniformly, which is compact, of simple and relatively inexpensive construction, easy to operate, and capable of high throughput capacity.

Still another object is to provide a method for the by-product coking of coal which gives improved tar yield at low investment and operating cost, and which is applicable particularly to coals that are not adapted to by-product coking by the procedures that are in use commercially.

Yet another object is to provide a method of by-product coking of coal by mixing highly heated granular material, such as coke, with the coal in accordance with which sticking and agglomeration are avoided by continuously returning a part of the coal-coke mixture to the point where the highly heated coke and coal meet.

The invention will be described in connection with the accompanying drawings in which Fig. 1 is a vertical longitudinal view through one form of apparatus provided by the invention with the progress of granular material through the furnace being indicated somewhat schematically; Fig. 2 a transverse cross section through the apparatus of Fig. 1 taken on line II—II thereof; Figs. 3 and 4 transverse cross sections through modified embodiments of apparatus provided by the invention taken similarly to Fig. 2; and Fig. 5 a schematic representation of the invention as applied to the by-product coking of coal.

We have discovered, and the invention is predicated in large part upon this, that granular solids may be heated satisfactorily and with reduction or avoidance of difficulties encountered heretofore in heating them, by passing the granular material into a chamber, to which heat is supplied, and causing the individual granules to be agitated violently and to be impelled upwardly into the heated atmosphere while they are moved through the chamber. In this way all of the granules are exposed to heat both by radiation and by contact with hot gases, there is no accumulation of a large body of granules through which the heat is transferred slowly or non-uniformly with the danger of overheating some parts and underheating others, and the heating is accomplished rapidly and uniformly.

Agitation and attendant impelling of the granules upwardly into the furnace atmosphere may be accomplished in various ways. We now prefer to provide in the bottom of the furnace a longitudinal conduit or conduits provided with spaced perforations through which jets of a gas, such as air, are forced to agitate the granular material vigorously and to throw individual granules upwardly into the furnace atmosphere at intervals, i. e., as the granules near or reach a perforation through which gas is flowing.

The heat may be supplied variously also. For example, the granular material may be heated wholly or in part by radiant heat. To such ends the heating chamber may be heated solely by radiant heat passed through the furnace roof, or the chamber may be heated by flame burners so that the heating will be largely or partly by radiation. Or, for special purposes the heat may be supplied by hot gases which may, if desired, be used in place of air for agitating and impelling the granular material upwardly into the furnace atmosphere. For certain purposes the heat may even be supplied by combustion of a material added solely to supply heat, or by partial combustion of a combustible solid that is to be heated.

The apparatus provided by the invention may be embodied in various forms but the heating chambers have two features in common. First, the bottom of the heating chamber slopes downwardly from the feeding end at an angle that preferably is slightly less than the angle of repose of the granular material being heated. Second, the bottom is provided with at least one perforated pipe, or group of jets, as described above, for the introduction of the granule-impelling air or other gas. The gas introduced through that pipe serves the function described above and in cooperation with the slope of the furnace bottom it serves to move the material automatically through the furnace to the lower, or discharge, end. This moving of the material can be done in two ways. If the gas jet velocities are relatively low, the granular material will flow in a rather smooth stream near the bottom of the chamber and, after classifying has taken place, there is little movement of particles from the top to the bottom of the stream, or vice versa, and the particles near the bottom of the stream are largely shielded from roof radiation. On the other hand, if the jet velocities are sufficiently great, the material will move through the furnace with turbulent flow and all particles will be subjected to substantially the same heating conditions. The latter method is preferred for most purposes.

Several of the various possible embodiments of apparatus provided by the invention are shown in the drawings. The preferred embodiment is represented by Figs. 1 and 2. This furnace comprises side walls 1 which, as shown in Fig. 2, slope upwardly and outwardly and cooperate with a roof 2 and end walls 3 to form a heating chamber 4 of upright V-shaped cross section. All of these walls are constructed from suitable refractories.

Mounted in the bottom of the chamber 4 thus formed, i. e., at the vertex of the V-section there is a longitudinally extending pipe 5 provided along its length with spaced perforations 6 through which air or other gas from a suitable source, not shown, may be forced into the heating chamber at intervals from the intake to the discharge end. As will be observed from the drawings, the perforations 6 are so disposed that the jets of air or other gas issue from them in a direction substantially perpendicular to the longitudinal axis of the heating chamber.

The roof 2 is provided adjacent its upper, or elevated, end with suitable means 7 for feeding the granualr material which is to be heated, and adjacent thereto is a pipe 8 for withdrawal of furnace gases. The lower end wall 3 is provided with an opening 9 for discharging fully heated material. In this embodiment a burner 10 is mounted in a port 11 disposed centrally of the lower end wall 3 for heating the furnace chamber.

Fig. 3 illustrates a modified form of apparatus in which the bottom 12 is flat and cooperates with side walls 1a and a roof 2a to provide a heating chamber 4a of rectangular cross section. This bottom wall slopes at an angle as described in connection with Fig. 1, and it is provided with one or more perforated conduits 5a through which air or other gas under pressure is discharged in jets for agitating and impelling upwardly granular material that is passing through the heating chamber. In this embodiment the chamber may be heated by burners 10a in the case of the apparatus of Figs. 1 and 2.

Fig. 4 illustrates an apparatus of generally V-shaped cross section, as preferred, the top wall 12a of which is formed of silicon carbide, a heat resistant ferrous alloy, or other highly heat conductive material. Plate 12a serves also as the bottom of a combustion, or muffle, chamber 13 which is heated in any suitable manner, as by burners 14, so that the heating chamber 4b through which the granular material is passed and which is otherwise constructed and mounted as described in connection with Fig. 1, is heated solely by radiation. Heating air or other gas is supplied through a pipe 5b perforated at intervals to provide jets, as described above.

The amount of air or other gas supplied through pipes 5, 5a and 5b will depend, as will be understood, in part upon such factors as the size and density of the granules being heated, the length of the heating chamber, the desired throughput capacity, and the like. For many purposes we prefer to use a relatively small volume of high velocity air rather than a larger quantity of low velocity air, to avoid having to heat excessive amounts of air and also because high velocity jets insure sufficient turbulence and bouncing of the granules so that they are all exposed to radiation. Thus as the granules reach the zone of influence of a jet of air or other gas from a perforation 6 they are tossed upwardly into the atmosphere of the heating chamber, and because of the inclination of the bottom of the chamber they fall at a point nearer its discharge end so that the granules move from the inlet to the discharge in a series of hops. Particularly is this desirable where combustible material, such as coke, is being heated because thereby it is possible to use such a ratio of coke to air for agitation as to insure that only a small proportion of the coke will be burned by the agitation air.

The burners of the apparatus shown in Figs. 1 and 3 may be operated with gas, oil or powdered coal, depending upon local circumstances or the desirability of using a particular furnace atmosphere. Instead of supplying heat by burners as in Figs. 1 to 3, or wholly by radiation, as in Fig. 4, the air supplied through the bottom conduits may be heated, or it may be replaced by combustion gases from any suitable source. Or, heat may be supplied by combustion of a material passed through the heating chamber, as suggested above. For most purposes we now prefer that the roof of the heating chamber be situated relatively close to the bottom for increasing heat radiation and for heat and construction economy.

Although the apparatus and method described are applicable generally to the heating of granular solids for various purposes, their use may be exemplified particularly with reference to by-product coking. Particularly they are suited especially to the carbonization of bone coal and other low value coals of high ash and low coking power. It has been proposed heretofore to effect coal carbonization by heating coke or other inert materials to an appropriately high temperature and then mixing such heated material with coal whereby it is coked by the heat thus supplied. So far as we are aware such proposals have been unsuccessful, and we believe that this is due in part to difficulties that have been encountered in satisfactory heating of the coke, and in part to sticking and agglomeration of the heated coke-coal mixture. The method of and apparatus for heating in accordance with the present invention are, as we have found by experience, admirably adapted to such a procedure, and we have conceived a way of avoiding sticking and agglomeration during coking of the coal.

Having reference now to Fig. 5, granular coke, in the form of coke breeze, is fed to a heater 20 constructed in accordance with this invention, as described above and suitably of the type shown in Fig. 1. The heated coke passes from discharge opening 9a into a conduit 21 and thence into a mixer 22. Granular coal, say of about the same size as the coke breeze, is introduced through a hopper 23 into the mixer adjacent the hot coke feed. In accordance with the present invention this mixer is provided with means for promptly mixing the coal and for continuously recirculating a portion of the coke-coal mixture to the point where the heated coal and the coke meet. It may take the form of a recirculating pug-type mill provided with two horizontal rotating shafts provided with paddles and rotated in opposite directions so that, one set of paddles moves the material lengthwise in one direction and the other set of paddles moves it in the other direction. Thus, in addition to rapid mixing transversely of the mixture, there is likewise a slow longitudinal circulation of it. The mixer 22 is preferably heat insulated, as will be understood. The gases evolved by coking of the coal are withdrawn through a take-off 24, and the final resultant coke leaves the mixer through a discharge pipe 25.

Conduit 21 is preferably provided with a star feeder or equivalent device, indicated schematically at 21a, to permit hot breeze to flow into the pug mill while preventing out flow of by-product gases from it to heater 20. A similar device, shown schematically at 23a, serves to permit feeding of coal without loss of by-product gases to the atmosphere, and the coke discharge conduit 25 is likewise provided with an appropriate similar member 25a for the same purpose.

In the operation of a plant such as represented by Fig. 5 a stream of coke breeze is first heated in heater 20, passed through mixer 22, and returned to the heater. Through this circulation of heated coke all of the parts are brought up to the operating temperature. When the mixer is at a suitable internal temperature the feeding of heated coke from heater 20 to mixer 22 is continued and feeding of coal to the mixer is begun. The heated coke and coal are fed in such relative proportions that the coal will be adequately carbonized, or coked, by the heat supplied by the coke with maintenance of the contents of the mixture at the correct temperature at all times. Thus each piece of incoming coal is promptly stirred into intimate contact with sufficient coke at the proper temperature to convert it quickly into tar-laden gas and additional coke breeze. The internal circulation in the mixer keeps the incoming coal in distribution through so much heated coke breeze that the pieces of coal pass through the plastic state rapidly. Excessive agglomeration and sticking are avoided by high ratio of dry or non-plastic surface area to sticky or plastic surface area, locally. The incoming hot coke breeze supplies sufficient heat to the material within the mixer to compensate for the cooling effect of the incoming coal and thus maintains the contents of the mixer at the correct temperature. Inasmuch as coke breeze is being continuously produced, an appropriate amount is withdrawn from the mixer as net production. It may be circulated as need be to the heater 20 for heat economy, or used for steam generation or other purposes where special properties are not requisite. The tar-laden gas is treated in the usual way.

Instead of using a pug mill type mixer such as described in connection with Fig. 5 there may be used other devices to obtain circulation of the coal-coke mixture. Thus, a variable speed return conveyor can be used to advantage for returning the mixture to the point where the coal and the hot coke meet. Also, multiple hot-coke inlets and multiple coal inlets can be installed along a straight-line mixing conveyor. The degree of agglomeration may be varied by changing the local ratio of coal to coke at those points in the mixer where coal is added. For maximum by-product recovery the mixer 22 of Fig. 5 is operated to make low temperature tar and coke, and this low temperature coke is then fed through a suitable externally heated agitating conveyor, such as a screw conveyor, or through a vertical retort, where it is contacted with superheated steam to form water gas together with additional amounts of tar, hydrocarbon gases and ammonia. Some air for combustion may be introduced with the steam into such equipment. Or, the coke discharge from mixer 22 may pass into transfer buckets or a bin vented into the gas take-off 24 where the coke is held for additional reaction time.

Various modifications are, of course, permissible. For example, heaters in accordance with the invention may be used for various purposes other than that specifically illustrated in Fig. 5. For instance, coke heated in such a heating chamber may be passed directly to a similar chamber in which agitation is effected with superheated steam to produce water gas, no burner or other source of external heat being necessary in this gas producing unit. Or, coke breeze heated to a high temperature in a chamber as provided by the invention may be fed into the tuyères of a blast furnace, as by means of small diameter screw feeders of heat resistant material passing through the blowpipes. Such auxiliary heating of the hearth of an iron blast furnace with fuel which has not been subjected to alteration in the upper part of the furnace has long been considered to be desirable but it has not been done for lack of a practical method of supplying preheated coke and because the flame temperature of cold coke, even with hot blast, is too low for good practice.

These heaters are adapted likewise to the heating of materials other than coke such, for example, as sand, ores, fluxes, and a large variety of other granular solids which do not become sticky or fused at the operating temperature, or to mixtures of such materials, either to effect a desired interaction or to prepare them for some subsequent operation in which they are required in heated condition.

As indicated above, other gases than air may be used for effecting agitation and upward impelling of the granules, which gases may be either reactive with or inert to the material being heated. Thus, combustion gases or steam may be used, and the burner may be adjusted to make the furnace atmosphere either oxidizing or reducing. With an oxidizing atmosphere the heating chamber may be used for roasting sulfide ores, as another example of the wide applicability of the invention.

Coal may be preheated for any desired purpose, for instance before feeding it to the mixer of Fig. 5. This may be done by passing the coal through a heating chamber in accordance with the invention and passing the flue gases from the coke heater to the main portion or the agitating conduit of the coal heating chamber. In this instance the coal should, of course, not be heated to a point where it will be softened, which would interfere with its travel. This mode of heating coal is desirable because it avoids oxidation, which would decrease the tar yield.

Where coke is to be heated and some combustion is not objectionable, the heating chamber may be operated by initially supplying heat from a burner or other external source which is discontinued after the chamber has been brought up to heat, the necessary heat for further operation being supplied by partial combustion of the coke. Usually, however, greater capacity or more stable operation can be had using supplemental heating, as by the burners shown.

According to the provisions of the Patent Statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. Apparatus for heating granular material comprising a heating chamber having its bottom inclined at an angle slightly less than the angle of repose of the material to be heated, the chamber having side walls flaring outwardly and upwardly from the bottom so that it is of substantially upright V-section, means for supplying heat to said chamber, openings at the upper and lower ends of the chamber for respectively introducing material to be heated and withdrawing heated material, and a conduit disposed longitudinally of said chamber along its bottom and provided with spaced openings for introducing jets of gas into the chamber to impel granules of said material upwardly into the chamber in a direction substantially perpendicular to the axis of said chamber as they pass through it, said gas conduit and heat supplying means being separately and independently associated with the heating chamber so as to establish and maintain a high temperature throughout said chamber.

2. An apparatus as in claim 1 wherein the gas conduit is positioned in the bottom vertex of the V-section.

3. An apparatus as in claim 1 wherein the heat supplying means comprises a flame burner mounted in a port provided in a wall of said heating chamber.

4. An apparatus as in claim 1 wherein the heat supplying means is separated from the interior of said chamber by a wall formed of heat conductive material, and is so positioned with respect to said wall that heat from said heat supplying means is transferred to said interior through said wall.

CALEB DAVIES, JR.
ROBERT YORK, JR.

REFERENCES CITED

The following references are of record in the file of this patent:

UNITED STATES PATENTS

| Number | Name | Date |
|---|---|---|
| 284,178 | Browne | Sept. 4, 1883 |
| 1,019,958 | Hannam et al. | Mar. 12, 1912 |
| 1,295,729 | Goldthorpe | Feb. 25, 1919 |
| 1,472,314 | Webster | Oct. 30, 1923 |
| 1,611,098 | Borner | Dec. 14, 1926 |
| 1,712,082 | Koppers | May 7, 1929 |
| 1,802,960 | Simonds | Apr. 28, 1931 |
| 1,899,887 | Thiele | Feb. 28, 1933 |
| 2,316,664 | Brassert et al. | Apr. 13, 1943 |
| 2,343,337 | Somes | Mar. 7, 1944 |
| 2,371,619 | Hartley | Mar. 20, 1945 |

FOREIGN PATENTS

| Number | Country | Date |
|---|---|---|
| 429 | Great Britain | Jan. 5, 1912 |